Aug. 7, 1962 J. J. DUFFY 3,048,184
FLUID PRESSURE GOVERNOR MECHANISM
Filed June 13, 1960 2 Sheets-Sheet 1

INVENTOR.
JAMES J. DUFFY
BY
ATTORNEYS

Aug. 7, 1962        J. J. DUFFY        3,048,184
FLUID PRESSURE GOVERNOR MECHANISM
Filed June 13, 1960                2 Sheets-Sheet 2
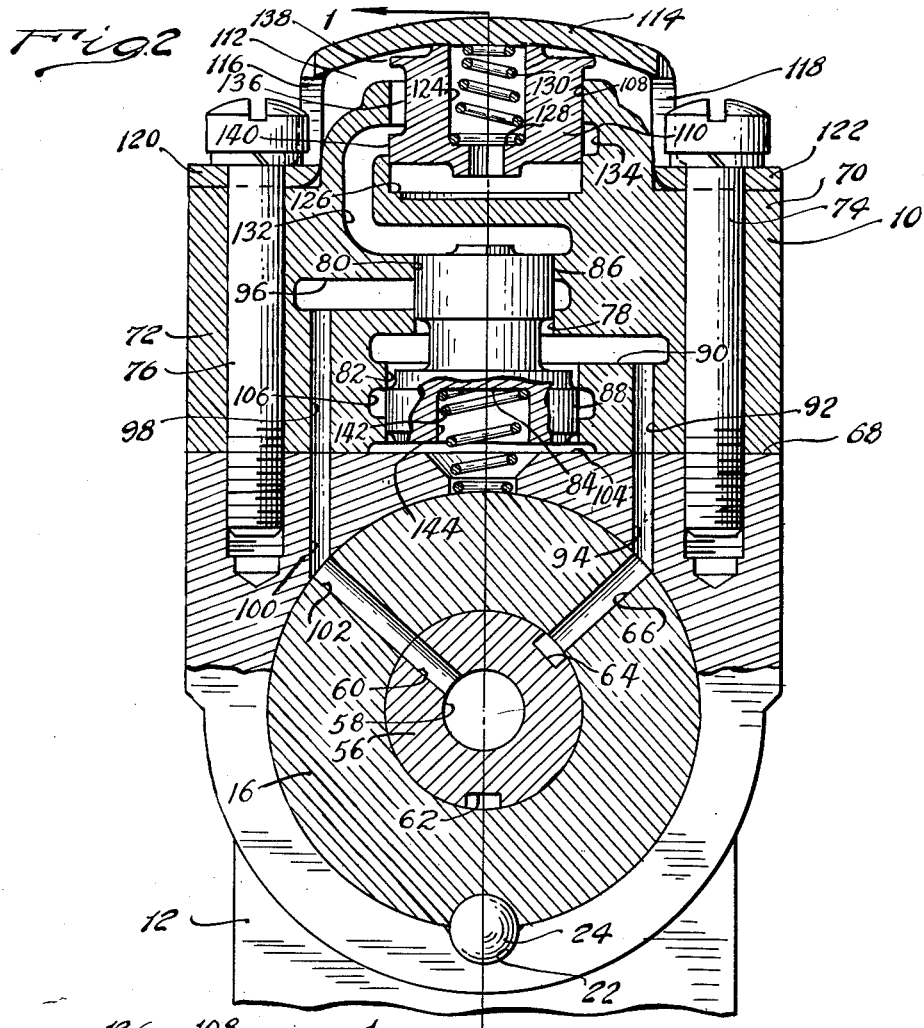
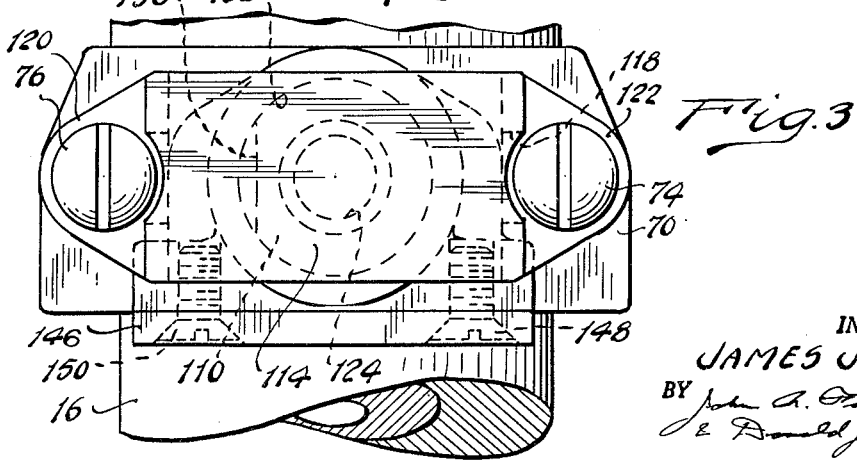
INVENTOR.
JAMES J. DUFFY
BY
ATTORNEYS 3,048,184
FLUID PRESSURE GOVERNOR MECHANISM
James J. Duffy, Scottsdale, Ariz., assignor to Ford Motor Company, Dearborn, Mich., a corporation of Delaware
Filed June 13, 1960, Ser. No. 35,708
8 Claims. (Cl. 137—51)

My invention relates generally to speed indicators, and more particularly to a new and improved governor valve mechanism capable of providing a pressure signal that is proportional in magnitude to the speed of rotation of a rotary member.

I contemplate that my improved governor valve mechanism may be used in an automatic control valve circuit for a multiple speed, power transmission mechanism. Such transmission mechanisms employ clutch and brake servos that are capable of controlling the relative speeds of the gear members of the mechanism, and in this way a transition from one operating speed ratio to another can be accomplished. The clutch and brake servos are pressurized by means of a fluid pressure pump drivably connected to a rotary member of the mechanism, such as the power input shaft.

Conduit structure is provided for establishing fluid communication between the pump and the clutch and brake servos. This conduit structure includes shift valve elements that are adapted to separately distribute fluid pressure to the individual clutch and brake servos. One such shift valve is adapted to initiate a first speed ratio change, and another shift valve is adapted to initiate a subsequent speed change as the driven member is accelerated from a standing start to the normal operating speed.

The shift valves in turn are sensitive to the torque input and to the speed of the driven member. My improved governor mechanism may be drivably connected to the driven member, and it is capable of supplying the transmission control valve circuit with a speed signal that may be utilized as above described to initiate the operation of a shift valve during a shift sequence.

I am aware of various multiple stage governor valve mechanisms of known construction that are utilized in that above fashion for controlling speed ratio changes in a multiple speed power transmission mechanism. It is desirable in most instances to increase the sensitivity of the governor valve mechanism during operation in the low speed range so that a given change in the driven speed of the driven member will result in a relatively large change in the governor pressure signal made available to the control valve circuit. Means are therefore provided for decreasing the sensitivity during operation in the high speed range.

A first shift valve in the control valve circuit is actuated when the governor valve mechanism is functioning in the lower speed range, and a second valve mechanism is calibrated so that it will initiate a speed ratio change while the governor mechanism is operating in the higher speed range with lower sensitivity.

These conventional valve constructions employ a metering valve element that is centrifugally responsive and which is subjected to a governor pressure force that opposes and balances the centrifugal forces. A transition from one operating range to another is accomplished by changing the weight distribution of the centrifugally operated mass which influences the regulation of the valve element. It is also possible to make provision for altering the effective area on which the governor pressure is caused to act so that during operation in the lower speed range, the governor valve element will be less sensitive to changes in governor pressure than during operation in the higher speed range. A transition from one range to another takes place when the effective governor pressure area on the valve element is altered.

The governor valve mechanisms of the type above described include a control pressure port and a governor pressure port as well as an exhaust port, and the degree of communication between the governor pressure port and the other two ports is controlled by the centrifugally responsive valve element. For example, at high driven speeds the centrifugal forces will cause the valve element to increase the degree of communication between the control pressure port and the governor pressure port while simultaneously decreasing the degree of communication between the governor pressure port and the exhaust port. All three of these ports are necessary if the valve mechanism is to function in the manner above described.

In my improved governor valve mechanism I have eliminated the need for using a compound centrifugally responsive mass for actuating the regulating valve element, and I have also eliminated the necessity for providing a means for varying the effective pressure area on the metering valve element. The metering characteristics of my improved governor mechanism will remain substantially uniform throughout the entire operating range although the pressure signal which is made available to each of the shift valves for initiating the various speed ratio shifts will be at an optimum value in each instance. My mechanism therefore will provide a result which is the equivalent of that which is obtained with a relatively complex governor valve mechanism although only a single metering characteristic is required.

The provision of a governor valve mechanism of the type above described being a principal object of my invention, it is a further object of my invention to provide a governor valve mechanism of simplified construction wherein the metering valve of the governor valve mechanism is rendered insensitive to speed changes during operation at relatively low speeds, and wherein means are provided for establishing normal metering operation when the operating speeds are greater than a predetermined design value.

It is a further object of my invention to provide a governor valve mechanism of the type above described wherein the exhaust port associated with the metering valve is controlled by a centrifugally responsive pilot valve which interrupts communication between the valve chamber and the exhaust region during operation at relatively low speeds, and which is effective to establish such communication when the operating speed is greater than a predetermined design value.

It is a further object of my invention to provide a governor valve mechanism of the type above described which includes two valve parts, one valve part being adapted to modulate the supply pressure to produce a governor pressure that is proportional in magnitude to the speed of rotation of a driven member. The other valve part is adapted to inhibit the pressure regulating action of the pressure modulating valve element during operation of the valve mechanism at relatively low speeds and to accommodate such regulation during operation at high speeds.

It is a further object of my invention to provide a governor valve mechanism for a control valve circuit of the type above described wherein provision is made for rendering the governor valve mechanism insensitive to speed changes during operation below the speed at which the first speed ratio change is initiated, and which is effective thereafter to establish a speed signal proportional in magnitude to the driven speed during operation at speeds greater than the speed at which such a shift occurs.

It is a further object of my invention to provide a governor valve mechanism of simplified construction and which can be readily adapted to be used in a variety of automatic control valve circuits of known construction.

For the purpose of more particularly describing the improvements of my instant invention, reference will be made to the accompanying drawings wherein:

FIGURE 2 is a cross sectional view of my governor mechanism taken along section line 2—2 of FIGURE 1;

FIGURE 3 is a plan view of the governor mechanism of FIGURES 1 and 2; and

Figure 1:
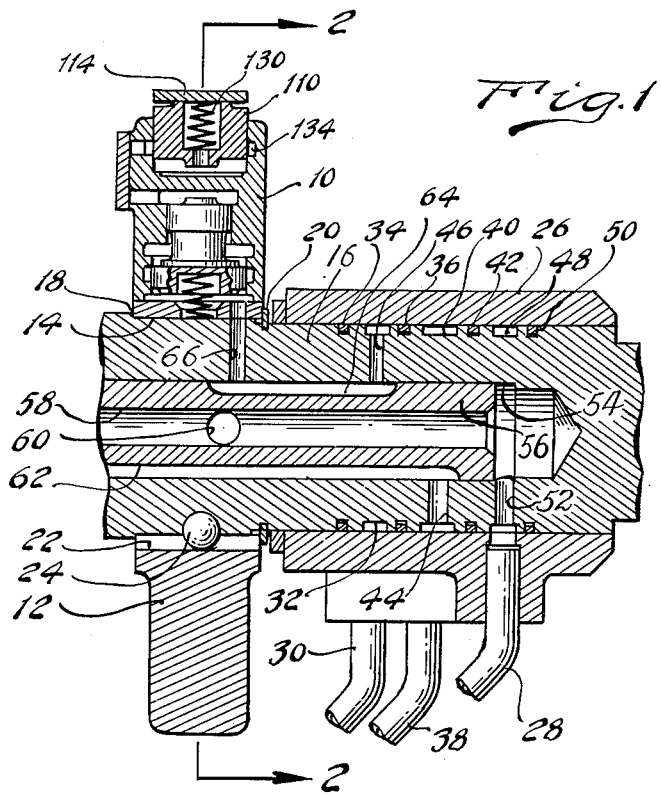
FIGURE 1 is a cross sectional view of my governor mechanism together with a portion of a power output shaft for a multiple speed power transmission mechanism, said governor mechanism being drivably connected to said power output shaft.

Referring first to FIGURE 1, numeral 10 generally designates a valve body which may be of cast construction. Body 10 is formed with internally cored passages for accommodating the distribution of pressure to various parts of the valve assembly as will subsequently be explained.

Body 10 is secured to a counterweight casting 12 which is internally apertured as shown at 14, a rotary shaft 16 being received through aperture 14 as indicated. The shaft 16 may be the power output shaft for a multiple speed power transmission mechanism.

Shaft 16 can be formed with a shoulder 18 and the casting 12 can be held against shoulder 18 by means of a snap ring 20 carried by the shaft 16. The inner surface of the aperture 14 is grooved as shown at 22 for accommodating a ball 24, the latter being disposed in a cooperating recess in shaft 16. The groove 22 and the ball 24 form a key connection between the casting 12 and the rotary shaft 16 whereby the governor mechanism rotates in unison with shaft 16.

A relatively stationary sleeve 26 surrounds shaft 16 and it forms a part of the transmission housing. A line pressure passage 28 is situated within a cooperating port formed in the stationary sleeve 26, and a governor pressure passage 30 is connected similarly to stationary sleeve 26 as indicated. Governor pressure passage 30 communicates with a groove 32 formed about the periphery of shaft 16. Sealing rings 34 and 36 are provided on either side of the groove 32.

A third passage 38 is connected to stationary sleeve 26 and it communicates with another annular groove 40 formed in shaft 16. The aforementioned sealing ring 36 and another sealing ring 42 are provided for sealing purposes. The passages 28 and 38 both communicate with a fluid pressure source, such as a power input shaft driven pump, that is capable of providing control pressure for the governor valve mechanism as well as for the other components of the control valve circuit.

Groove 40 communicates with a radial passage 44 formed in shaft 16, and groove 32 communicates with a radial passage 46 located in spaced relationship with respect to passage 44. Line pressure passage 28 communicates with a third annular groove 48 formed in shaft 16, and the aforementioned sealing ring 42 and another sealing ring 50 are situated on either side of groove 48 for sealing purposes. Control pressure is distributed to groove 48 through control pressure passage 28.

Groove 48 communicates with a radial passage 52 formed in shaft 16, and it is effective to distribute control pressure to an internal bore 54 formed in shaft 16.

Bore 54 receives an adapter 56 which is formed with an internal passage 58 that is effective to distribute the control pressure from passage 52 to a port 60 formed in adapter 56.

The adapter 56 is formed also with a longitudinally extending groove 62 which establishes communication between radial passage 44 and a servo mechanism for the transmission clutches or brakes, not shown. Another longitudinally extending groove is formed in adapter 56 as indicated at 64. This groove 64 establishes communication between radial passage 46 and another radial passage 66 formed in shaft 16.

Referring next to FIGURE 2, it will be seen that the casting 12 is formed with a flat surface 68 on which the casting 10 is bolted. The casting 10 is formed with shoulders 70 and 72 through which clamping bolts 74 and 76, respectively, extend. The bolts 74 and 76 are received threadably within cooperating threaded openings within the casting 12.

A valve chamber 78 is formed in casting 10, and it is characterized by a small diameter portion 80 and a relatively large diameter portion 82. The valve chamber 78 is circular in form, and it is adapted to receive a valve spool 84 having differential diameter valve lands 86 and 88 which respectively cooperate with valve chamber portions 80 and 82. A cored passage 90 communicates with the valve chamber 78 at a location intermediate the valve lands 86 and 88. Passage 90 in turn extends to a passage 92.

Another passage 94 is formed in shaft 16, and it communicates with passage 92 to establish fluid communication between the aforementioned longitudinal groove 64 and the aforementioned cored passage 90.

Another cored passage 96 communicates with chamber 78, and it communicates with a passage 98 formed in body 10. Casting 12 is formed with a passage 100 that communicates with passage 98, and it also communicates with a radial passage 102 formed in shaft 16. Radial passage 102 establishes communication between the aforementioned port 60 and the passage 100, and fluid communication is thereby established between port 60 and the aforementioned cored passage 96.

A portion of the chamber 78 on the radially inward side of the valve spool 84 is designated by reference character 104, and it is in communication with an exhaust region through an exhaust port, not shown, in body 10. An internal annular groove 106 is formed in chamber 78 in the region of the exhaust portion 104 of chamber 78. Both the groove 106 and the exhaust portion 104 communicate with the exhaust region.

The aforementioned passage 96 forms a part of an annular groove which is situated internally in the chamber portion 80. Valve land 86 on the valve spool 84 controls the degree of communication between passage 96 and passage 90. In a similar fashion, valve land 88 controls the degree of communication between the exhaust groove 106 and passage 90.

Valve body 10 is formed also with a second pilot valve chamber 108 of cylindrical form. A cylindrical pilot valve element 110 is positioned slidably within pilot valve chamber 108. The radially outward end of the chamber 108 opens into an exhaust region 112 on the exterior of the valve body 10. A valve cap 114 extends across the open end of pilot valve chamber 108, and it is formed with apertures 116 and 118 at either side thereof to establish free communication between region 112 and the exterior ambient region. The cap is formed with side shoulders as indicated at 120 and 122 to facilitate clamping of the cap 114 to the valve body 10. The bolts 74 and 76 can be used for this purpose, the shoulders 122 and 120 being suitably apertured to receive the bolts 74 and 76, respectively.

The pilot valve element 110 is formed with an internal cavity 124 which is open at either end. Cavity 124 thereby provides a means for exhausting the base portion 126 of the pilot valve chamber 108. Cavity 124 is also formed with a spring seat 128 on which is seated a compression spring 130. Spring 130 is disposed between the seat 128 and the aforementioned cap 144 so that pilot valve element 110 is normally urged in a radially inward direction.

The radially outward end of the aforementioned valve chamber 78 is in fluid communication with a central portion of the pilot valve chamber 108 through an internal passage 132. Chamber 108 is formed with an internal annular groove 134 which forms a part of the aforementioned passage 132.

Pilot valve element 110 is formed with a flat 136 that establishes communication between groove 134 and the exhaust region 112. A valve land 138 is disposed at the radially outward extremity of the flat 136, and it cooperates with the outer end of the pilot valve chamber 108. Flat 136 also defines a radially inward land 140 which controls communication between passage 132 and the exhaust region 112.

Valve spool 84 is normally urged in a radially outward direction by means of a valve spring 142 which is received within a spring chamber 144. The radially inward end of spring 142 can be seated on the casting 12 or on the associated shaft 16 as indicated, the casting 12 being suitably recessed as indicated to accommodate spring 142.

The valve body 10 can be formed by means of a casting operation, and the internal passages 90, 96 and 132 can be formed by means of cores. The cored openings communicate with a common side of the casting and they may be closed by means of a closure plate 146 as indicated. The side of the body 10 is suitably machined to provide a flat surface on which the closure plate 146 is secured, suitable screws 148 and 150 being provided for this purpose.

During operation, control pressure is distributed to passage 96 through passage 28, passage 52, passage 58, port 60 and passages 102, 100 and 98. A suitable input shaft driven pump can be used as a fluid pressure source as previously explained. The valve spool 84 is normally urged in a radially outward direction by valve spring 142, and this tends to establish a certain degree of communication between passage 96 and passage 90. Passage 90 will therefore become pressurized, and this pressure in passage 90 will act on the differential area defined by the valve lands 86 and 88, thereby normally urging the valve spool 84 in a radially inward direction against the opposing force of valve spring 142. It is therefore apparent that the magnitude of the pressure which is made available to passage 90 will be equal to the spring force exerted by spring 142 divided by the differential area defined by valve lands 86 and 88. This pressure will exist in passage 90 when the shaft 16 is held stationary. Regulation is made possible since the exhaust groove 106, the passage 90 and the passage 96 cooperate with associated valve lands 86 and 88 to establish a pressure balance. If the valve spool 84 moves radially outward, the degree of communication between the passage 96 and passage 90 tends to increase and the degree of communication between exhaust groove 106 and passage 90 is simultaneously decreased. The converse is true if the valve spool 84 is moved radially inward.

The pilot valve element 110 is normally urged in an inward direction as previously explained, and when it is so positioned land 138 interrupts communication between passage 132 and exhaust region 112. This establishes a fluid pressure lock, and the pressure in passage 132 and in a radially outward region of valve chamber 78 then increases to a value which is equal to, or which approaches, the magnitude of the control pressure supplied to passage 96. This is due to the leakage that normally takes place between valve land 86 and the cooperating portion 80 of the chamber 78. This increase in pressure in the radially outward region of valve chamber 78 will cause valve spool 84 to move in a radially inward direction thereby inhibiting the normal regulating function of valve spool 84. Passage 90 will therefore be brought in communication with exhaust groove 106, and the magnitude of the pressure made available to longitudinal groove 64 in the adapter 56 is therefore equal to zero.

When the shaft 16 begins to rotate, the valve spool 84 will continue to be inoperative by reason of the pressure build-up in passage 132 and in the radially outward region of chamber 78. The pressure force acting on valve spool 84 due to this pressure build-up is sufficient to overcome the centrifugally operated forces acting on valve spool 84 and the spring force of spring 142 during the initial stages of operation.

After a predetermined speed is obtained; for example, 400 r.p.m., the centrifugal force acting on pilot valve element 110 is sufficient to overcome the opposing influence of valve spring 130, and valve element 110 will therefore move in a radially outward direction to the position indicated in FIGURE 2. This establishes communication between the exhaust region 112 and passage 132, thereby exhausting the pressure build-up which exists at the radially outward region of chamber 78. Valve spool 84 will thereafter be capable of regulating in the normal fashion at speeds greater than 400 r.p.m.

As the speed of rotation increases beyond 400 r.p.m., the magnitude of the centrifugal force acting on valve spool 84 due to its own mass increases, and this tends to increase the degree of communication between passage 96 and passage 90 while simultaneously decreasing communication between exhaust groove 106 and passage 90. This results in an increased pressure in passage 90 which is made available to groove 64 and the communicating passages 46 and 30. It is this pressure which may be utilized by the control valve circuit for control purposes since its magnitude will be an indicator of the speed of rotation of shaft 16. This pressure may therefore be appropriately termed "governor pressure."

If the speed of rotation of shaft 16 should subsequently decrease to a value less than the predetermined design value of 400 r.p.m., the spring force of spring 130 will again urge the pilot valve element 110 to a radially inward position, and this in turn results in a pressure build-up in the outer region of chamber 78. The regulation of valve spool 84 is then again interrupted. This results in a zero governor pressure.

Figure 4:
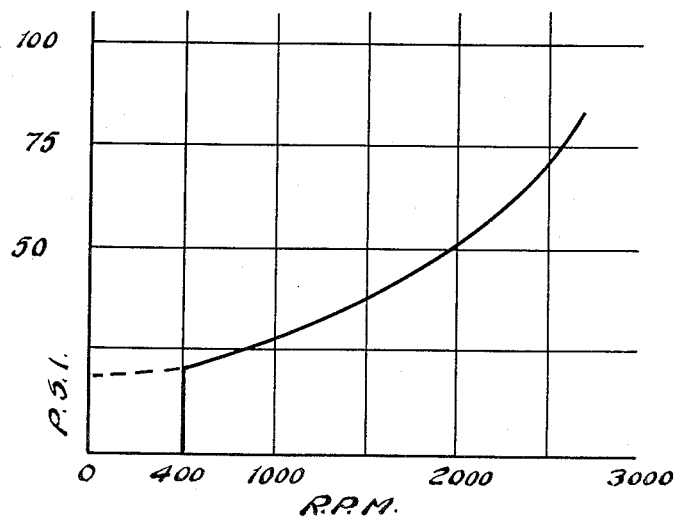
FIGURE 4 is a graphical representation of the pressure regulating characteristics of my improved governor valve mechanism.

Referring next to FIGURE 4, I have illustrated in graphic form the regulating characteristics of the governor mechanism aforedescribed. If the characteristic curve of FIGURE 4 is extended to the ordinate, the magnitude of the governor pressure which would be represented thereby would be equal to the spring force of spring 142 divided by the differential area of the valve spool 84. The pilot valve element 110, however, inhibits the regulating action of the valve spool 84 at the low speed range so that the actual governor pressure which is made available to governor pressure passage 30 is equal to zero rather than this projected value.

In a transmission control circuit for a multiple speed power transmission mechanism, the first shift valve can be made to operate at a speed equal to or slightly greater than 400 r.p.m. The actual shift point can be altered as required by the particular design requirements by suitably choosing the calibration of spring 130. The absence of a progressive governor pressure build-up in the speed range between zero and 400 r.p.m. has no direct bearing on the shift quality, and the only important consideration is the location of the shift point. If it is desired to employ a higher governor pressure at the first shift point, the calibration of spring 142 can be suitably altered. This will have the effect of either raising or lowering the characteristic curve of FIGURE 4, although the parabolic shape of the curve will remain unaltered. The variation in the spring rate for spring 130 will simply have the effect of changing the location along the characteristic curve at which the break point occurs.

Once the optimum shift point for the first speed ratio shift has been obtained, the optimum shift point for the succeeding speed ratio shift can then be obtained by suitably calibrating the valve spool 84. This can be done by making appropriate adjustments in the differential area on the valve spool 84 or by suitably altering the effective centrifugal mass of the valve spool.

My improved governor valve mechanism is thus characterized by a high degree of flexibility, and it may be readily adapted to suit a variety of different operating conditions as desired. Further, the magnitude of the governor pressure signal which is made available by the governor valve mechanism, and the opposed centrifugal and pressure forces acting on the valve spool 84, are of a high order of magnitude in comparison to the corresponding forces associated with conventional governor valve mechanisms. This condition reduces the possibility of valve sticking and it contributes to the over-all reliability of the mechanism.

Having thus described the principal features of a preferred embodiment of my invention, what I claim and desire to secure by United States Letters Patent is:

1. A fluid pressure governor capable of establishing a fluid pressure signal that is proportional in magnitude to the speed of rotation of a rotary member, a valve body carried by said rotary member, a control pressure passage and a governor pressure passage formed in said valve body, first valve means carried by said valve body for modulating said control pressure to establish in said governor pressure passage a speed signal, and second valve means carried by said valve body for inhibiting the modulating action of said first valve means when said rotary member is rotating at a speed less than a predetermined design value, said first valve means being insensitive to said second valve means when said rotary member is rotating at speeds greater than said predetermined design value.

2. A governor valve mechanism for use in establishing a pressure signal that is proportional in magnitude to the speed of rotation of a rotary member, a valve body carried by said rotary member, a control pressure passage and a governor pressure passage formed in said valve body, a first centrifugally responsive valve means in said valve body adapted to modulate the pressure in said control pressure passage to establish a governor pressure in said governor pressure passage that is proportional in magnitude to the speed of rotation of said rotary member, said valve means being subjected to said governor pressure whereby opposed centrifugal forces are established, and second centrifugally responsive valve means for inhibiting the modulating action of said first valve means during operation of said rotary member at speeds less than a predetermined design value.

3. A fluid pressure governor comprising a valve body, means for mounting said valve body on a rotary member, a valve chamber in said valve body, a control pressure passage and a governor pressure passage communicating with said valve chamber, a centrifugally responsive valve element in said valve chamber, said valve element having formed thereon a fluid pressure area, said valve element being adapted to control the degree of communication between said governor pressure passage and said control pressure passage in response to variations in fluid pressure and centrifugal forces acting thereon, the pressure in said governor pressure passage acting on said pressure area, said valve element and said valve chamber cooperating to define an exhaust pressure cavity, an exhaust passage extending from said cavity to an exhaust region, and pilot valve means carried by said valve body for interrupting communication between said cavity and said exhaust region during operation of said rotary member at speeds less than a predetermined design value.

4. A fluid pressure governor comprising a valve body, means for mounting said valve body on a rotary member, a valve chamber in said valve body, a control pressure passage and a governor pressure passage communicating with said valve chamber, a centrifugally responsive valve element in said valve chamber, said valve element being formed with a fluid pressure area, said valve element being adapted to control the degree of communication between said governor pressure passage and said control pressure passage in response to fluid pressure and centrifugal forces acting thereon, said valve element and said valve chamber cooperating to define an exhaust pressure cavity, an exhaust passage extending from said cavity to an exhaust region, and pilot valve means carried by said valve body and defining in part said exhaust passage, said pilot valve means including a movable pilot valve element, means for normally biasing said pilot valve element in a radially inward direction whereby communication between said valve cavity and said exhaust region is interrupted, said pilot valve element being moved radially outward under the influence of centrifugal force when the speed of rotation of said rotary member increases to a value greater than a predetermined design value whereby said cavity is brought into communication with said exhaust region.

5. A fluid pressure passage comprising a valve body, means for mounting said valve body in a rotary member, a valve chamber in said body, a control pressure port and an exhaust port formed in said body in communication with said valve chamber, a governor pressure port communicating with said valve chamber at a location intermediate said exhaust port and said control pressure port, a centrifugally responsive valve spool disposed in said valve chamber, said valve spool having valve lands of differential diameter, said governor pressure port communicating with said valve chamber at a location intermediate said valve lands, an exhaust passage communicating with the radially outward region of said valve chamber, pilot valve means carried by said valve body and defining in part said exhaust passage, said pilot valve means including a centrifugally responsive valve element that is urged in a radially outward direction under the influence of centrifugal forces, means for biasing said pilot valve element in a radially inward direction, said pilot valve element interrupting communication between the radially outward region of said valve chamber and the exhaust region when said pilot valve element assumes a radially inward position, said pilot valve element establishing communication between the radially outward region of said valve chamber and said exhaust region when it is urged radially outward under the influence of centrifugal force against the opposing force of said biasing means.

6. A fluid pressure passage comprising a valve body, means for mounting said valve body in a rotary member, a valve chamber in said body, a control pressure port and an exhaust port formed in said body in communication with said valve chamber, a governor pressure port communicating with said valve chamber at a location intermediate said exhaust port and said control pressure port, a centrifugally responsive valve spool disposed in said valve chamber, said valve spool having valve lands of differential diameter, said governor pressure port communicating with said valve chamber at a location intermediate said valve lands, an exhaust passage communicating with the radially outward region of said valve chamber, pilot valve means carried by said valve body and defining in part said exhaust passage, said pilot valve means including a centrifugally responsive valve element that is urged in a radially outward direction under the influence of centrifugal forces, means for biasing said pilot valve element in a radially inward direction, said pilot valve element interrupting communication between the radially outward region of said valve chamber and the exhaust region when said pilot valve element assumes a radially inward direction, said pilot valve element establishing communication between the radially outward region of said valve chamber and said exhaust region when it is urged radially outward under the influence of centrifugal force against the opposing force of said biasing means, the biasing means for said pilot valve element comprising a spring seated on a portion of said valve body and adapted to urge said pilot valve element in a radially inward direction.

7. A fluid pressure passage comprising a valve body, means for mounting said valve body in a rotary member, a valve chamber in said body, a control pressure port and an exhaust port formed in said body in communication with said valve chamber, a governor pressure port communicating with said valve chamber at a location intermediate said exhaust port and said control pressure port, a centrifugally responsive valve spool disposed in said valve chamber, said valve spool having valve lands of differential diameter, said governor pressure port communicating with said valve chamber at a location intermediate said valve lands, an exhaust passage communicating with the radially outward region of said valve chamber, pilot valve means carried by said valve body and defining in part said exhaust passage, said pilot valve means including a centrifugally responsive valve element that is urged in a radially outward direction under the influence of centrifugal forces, means for biasing said pilot valve element in a radially inward direction, said pilot valve element interrupting communication between the radially outward region of said valve chamber and the exhaust region when said pilot valve element assumes a radially inward direction, said pilot valve element establishing communication between the radially outward region of said valve chamber and said exhaust region when it is urged radially outward under the influence of centrifugal force against the opposing force of said biasing means, the biasing means for said pilot valve element comprising a spring seated on a portion of said valve body and adapted to urge said pilot valve element in a radially inward direction, and another valve spring acting on said valve spool, said valve spring being adapted to urge said valve spool in a radially outward direction to supplement the centrifugal forces acting thereon.

8. A fluid pressure governor capable of establishing a fluid pressure signal that is proportional in magnitude to the speed of rotation of a rotary member, a valve body carried by said rotary member, a control pressure passage and a governor pressure passage formed in said valve body, first valve means carried by said valve body for modulating said control pressure to establish in said governor pressure passage a speed signal, and second valve means operatively connected to said first valve means and carried by said valve body, said second valve means being operable below a predetermined speed of rotation of said rotary member for inhibiting the modulating action of said first valve means.

References Cited in the file of this patent
UNITED STATES PATENTS

| | | |
|---|---|---|
| 2,711,749 | Hettinger | June 28, 1955 |
| 2,941,539 | Hewko | June 21, 1960 |